United States Patent

Hunter

[15] 3,687,335

[45] Aug. 29, 1972

[54] OVERFILL LIMITING APPARATUS FOR FUEL TANKS

[72] Inventor: William A. Hunter, Royal Oak, Mich.

[73] Assignee: Chrysler Corporation, Highland Park, Mich.

[22] Filed: Nov. 18, 1970

[21] Appl. No.: 90,534

[52] U.S. Cl. .............................220/85 VR, 123/136
[51] Int. Cl. ...........................................F02m 59/00
[58] Field of Search................123/120, 119, 136; 220/85 S, 85 VS, 85 VR

[56] References Cited

UNITED STATES PATENTS

| | | | |
|---|---|---|---|
| 2,038,767 | 4/1936 | Spaeth | 220/85 S |
| 2,053,816 | 9/1936 | Elliott | 220/85 VS |
| 3,324,923 | 6/1967 | Thompson | 123/136 X |
| 3,517,654 | 6/1970 | Sarto et al. | 123/136 |
| 3,542,239 | 11/1970 | Latvala | 220/85 VR |

*Primary Examiner*—Laurence M. Goodridge
*Attorney*—Talburtt and Baldwin

[57] ABSTRACT

Overfill limiting means for fuel tanks in the form of a normally closed pressure operated valve in a vent line extending from the tank.

3 Claims, 6 Drawing Figures

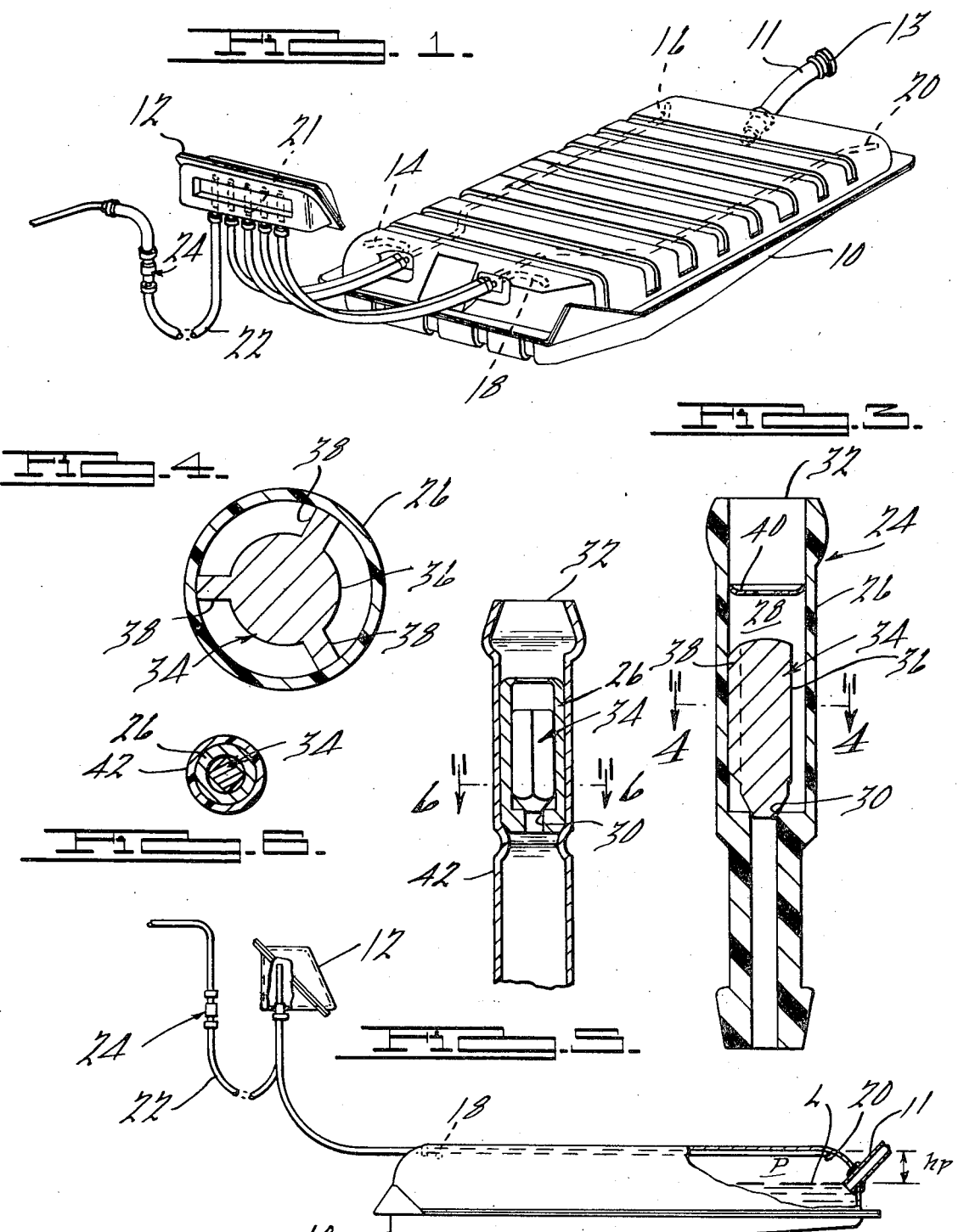

OVERFILL LIMITING APPARATUS FOR FUEL TANKS

BACKGROUND

This invention relates to fuel tank venting and evaporative control of fuel for motor vehicles. Evaporative losses of hydrocarbons from motor vehicle fuel tanks contribute significantly to the unburned hydrocarbons emitted to the atmosphere. As a result, there have been many attempts to contain these emissions by discontinuing the practice of venting motor vehicle fuel tanks directly to the atmosphere. Today, motor vehicles normally include a vapor storage means for collecting and storing fuel tank vapors and routing them to the motor vehicle engine when it is operating. I1 such a system, one or more vent lines usually communicate with the fuel tank where vapors tend to collect. The vapors flow through the vent line or lines to the vapor storage means where they are held until they are routed to the engine and burned.

With these systems, however, it has been found necessary to provide some means to prevent overfilling of the fuel tank and the carryover of liquid fuel through the vent lines to the vapor storage means. In the typical vented tank, as fuel enters the tank through the filler pipe, it displaces air and vapors therein. The air and vapors attempt to leave the tank by flowing out the filler tube or through the vent lines. In such an arrangement the fuel may completely displace the air and vapors in the tank filling it to the top and also filling the filler pipe. The liquid fuel is then able to flow through the vent line or lines particularly upon thermal expansion of the fuel, changes in attitude of the vehicle and maneuvering inertia forces. This is undesirable and is to be avoided.

One solution to this problem has been disclosed in U.S. Pat. No. 3,517,654 entitled "Evaporative Emission Control System" which issued on June 30, 1970. The solution proposed therein comprised a small container carried inside the fuel tank at its top. The auxiliary container included a small hole in its bottom for allowing fuel to leak into the auxiliary container as the main tank is filled and small hole at the top to allow vapors contained therein to escape to the main tank. By making the inlet hole of the auxiliary chamber extremely small, the filling of the auxiliary chamber was delayed thereby allowing the main fuel tank to be filled without filling the auxiliary tank. This delay provided an overfill limiting means wherein the level in the main fuel tank would drop after filling as fuel flowed into the auxiliary chamber. There was thus provided a means for assuring the presence of a vapor space or volume in the top of the main tank and thus maintaining a separation between the liquid fuel and the vent line or lines communicating with the tank in this space.

Although this solution has been satisfactory, continued development has been carried on in the hope of obtaining a less expensive structural arrangement for preventing overfill of the tank.

SUMMARY OF THE INVENTION

This invention provides what is believed to be a less expensive solution to the overfilling problem. According to the invention there is provided a normally closed valve means in the vent line which communicates between the fuel tank and the vapor storage means. The valve is constructed and arranged to be pressure operated and it opens when a predetermined pressure exists inside the tank. The pressure required is one which is greater than the pressure created by a filled tank as will be explained hereinbelow. Two preferred embodiments of pressure operated valves are disclosed herein for these purposes.

BRIEF DESCRIPTION OF THE DRAWING

FIGS. 1 and 2 are perspective and side elevation views, respectively of a motor vehicle fuel tank embodiment showing a vent system; a portion of FIG. 2 is broken away.

FIGS. 3 and 4 are sectional views of a preferred valve embodiment, section 4 being taken along lines 4—4 of FIG. 3.

FIGS. 5 and 6 are sectional views of another embodiment of the preferred valve, FIG. 6 being taken along lines 6—6 of FIG. 5.

DESCRIPTION OF THE PREFERRED EMBODIMENTS

Referring now to the drawing, FIGS. 1 and 2 show an evaporative control system including a sealed fuel tank 10 and a filler pipe 11 (fuel line not shown). An optional liquid vapor separator 12 is shown connected to the tank by a series of vent lines. Filler pipe 11 may be sealed with a pressure vacuum relief filler cap 13 as indicated in FIG. 1 of the standard type which provides vacuum relief at 7 to 14 inches of water and pressure relief at 14 to 18 inches of water.

Liquid-vapor separator 12 is mounted higher than tank 10 as shown and may be conveniently positioned within the rear automobile "kick-up" (not shown). Fuel tank 10 includes vent means, such as the four vent lines 14, 16, 18 and 20 which are generally positioned in each of the upper fuel tank corners as shown. The open ends of the vent lines allow fuel vapors and air, which tend to collect in the top of the tank, to flow to the liquid vapor separator 12. One of the lines, for example 16, may be slotted near the separator floor as shown at 21 to provide a drain-back means in separator 12 by means of which liquid fuel carried over into the separator by the vent lines may be returned to the fuel tank. Liquid vapor separator 12 also includes an additional vent line 22 which communicates with the vapor storage means carried on the motor vehicle and may for example be the engine crankcase (not shown). Vapor collected in vapor liquid separator 12 from fuel tank 10 may thus pass over vent line 22 to be stored in the vapor storage means.

If a liquid vapor separator is not included, vent lines 14, 16, 18 and 20 would not be necessary and vent line 22 would simply make direct contact with fuel tank 10 to collect vapors therefrom.

Vent line 22 includes normally closed pressure operated valve means 24. With reference to FIGS. 3 and 4, valve means 24 can be described in specific detail. The valve consists of a valve body 26 which includes an axial cylindrical passageway 28 therethrough. Passage 28 includes inlet opening 30 and outlet opening 32 as shown. Inlet opening 30 provides a seat for valve closure member 34 which is carried within passageway 28. Valve closure member 34 may consist of a central body portion 36 and vaned portion 38 which serve to center closure member 34 within passageway 28. As shown, closure member 34 is freely slidable or movable within passageway 28. When mounted in the vertical position as shown in FIG. 3, the valve will assume a normally closed condition since closure member 34 will seat against inlet opening 30 thus closing the valve to the flow of vapors from the fuel tank. Pressure against the bottom of closure member 34 at inlet 30 can raise closure member 34 thus opening valve 24 and allowing the passage or flow of vapors therethrough. However, the pressure must exceed the weight of closure member 34. A circular ring shaped screen or grid 40 may be forced into passageway 28 as shown in order to prevent removal of closure member 34 from passageway 28 and continued operation of the valve.

In operation of the overfill limiting arrangement, with valve 24 mounted in the vertical normally closed position, and a filler tube extending into the tank to a level L as shown in FIG. 2, air and fuel vapors in the fuel tank will be trapped during filling and forced to the top thereof during filling when fuel reaches level L at which point the fuel itself seals off the end of the filler pipe and prevents the escape of airs and vapor from the tank. The vent system is also sealed since valve 24 is closed. Continued filling of the tank compresses the vapors therein creating a pressure P which is substantially equal to the head pressure hp established by the fuel in the filler pipe itself. At this time, the tank appears to be full to the station attendant because the filler pipe is full and will accept no more fuel. However, in the tank there will be a space at the top containing trapped vapors. The size or volume of the space will depend on the depth of penetration of the filler pipe into the tank, its overall length and the pressure at which the overfill limiting valve 24 is operative.

It is necessary that the normally closed valve 24 open only at a predetermined pressure which is greater than the pressure created by the head hp of fuel in the filler pipe when the fuel tank is filled. Therefore, when full, the tank is sealed, the valve is closed and there is a vapor collection space and thermal expansion space at the top of the tank. With evaporation and thermal expansion pressures, the pressure P in the tank will increase to a value greater than the head pressure hp and ultimately will cause valve 24 to open by overcoming the weight of valve closure member 34 and removing it from its seat at inlet 30. Vapor will flow through the valve and vent line to the vapor storage means until the pressure drops below the pre-determined operative pressure point of the valve at which time it will again assume the normally closed condition.

It can be seen then that this invention provides a relatively simple and inexpensive overfill limiting means which causes vapor to be trapped in the fuel tank during filling thus assuring the presence of a vapor space in the top of the tank and the separation of liquid fuel from the vent lines. The overfill limiting means is also operable at a certain pressure to relieve the pressure in the tank and allow vapors to flow to a vapor storage means in an evaporative control system.

Referring now to FIGS. 5 and 6, another and more simplified embodiment of the overflow limiting valve means 24 is shown. In this embodiment the valve closure member 34 has a square cross section which provides the equivalent function as the fins 38 shown in FIGS. 3 and 4. Valve body 26 is turned inward at its top to provide an opening smaller than the size of valve closure member 34 thus serving to keep the valve closure member within the valve body. The entire valve is shown carried in a section of conduit 42 which may be conveniently connected into vent line 22 or the like. In this embodiment, a preferred valve closure member will consist of suitably shaped solid brass. Fabricating the valve body from brass is also desirable since the operating parts of the valve will then be un-corrosive and will assure continued certain sealing and operation thereof.

The embodiment of the invention in which an exclusive property right is claimed or defined are as follows:

1. A motor vehicle fuel tank vent system comprising:
a fuel tank;
a filler tube extending into the fuel tank to a depth of penetration which provides a vapor space in the top of the tank and a certain head of fuel in the filler tube when the tank is full;
a vapor storage means;
vent line means connected between the fuel tank and the vapor storage means, and
normally closed pressure operated valve means in the vent line, the valve means being opened by pressure in the fuel tank greater than the pressure developed when the tank is substantially full of fuel including the head of the fuel in the filler tube whereby overfilling of the tank is limited and vapor is periodically allowed to flow from the tank to the vapor storage means as the valve means opens,
the valve means including a vertically mounted valve body having an upright axial passage therein and including a lower inlet opening with a surface forming a closure seat and an upper outlet opening, and
an axially movable valve closure member carried in the passage, the closure member being normally seated on the inlet seat due to its weight which is such relative to the head of the fuel in the fuel tank whereby closing of the valve occurs when the tank is full, the closure member being so shaped as to have first lateral portions thereof spaced from the passage wall to allow vapor to flow past the member and through the valve body when the closure member is raised from the seat by excess pressure in the tank and to have second lateral portions abutting the passage wall to position the closure member axially in the valve body above the valve seat.

2. The system according to claim 1 wherein the second lateral portions comprise at least three spaced longitudinal fins to properly position the valve closure member in the passage.

3. The system according to claim 1 wherein the valve closure member is a rectangular parallelepiped in cross-section, and the corners thereof constitute the second lateral portion defined in claim 2 which contact the passage wall to properly position the closure member therein.

* * * * *